(12) United States Patent
Hayner

(10) Patent No.: US 6,169,641 B1
(45) Date of Patent: *Jan. 2, 2001

(54) METHODS AND DEVICES FOR CONTROLLING A HEAD POSITION ACTUATOR OF A DISK DRIVE

(75) Inventor: David A. Hayner, Austin, TX (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/923,685

(22) Filed: Sep. 4, 1997

(51) Int. Cl.$^7$ .................................................. G11B 5/596
(52) U.S. Cl. ...................................... 360/78.09; 360/78.04; 360/78.14
(58) Field of Search ............................. 360/78.01, 78.04, 360/78.08, 78.14, 78.06; 318/560, 561

(56) References Cited

U.S. PATENT DOCUMENTS

| | | | |
|---|---|---|---|
| 4,805,050 | * 2/1989 | Aoyagi et al. | 360/78.14 X |
| 4,920,462 | * 4/1990 | Couse et al. | 360/78.14 X |
| 5,245,595 | * 9/1993 | Yasukawa | 360/78.14 X |
| 5,285,330 | * 2/1994 | Masaki | 360/78.14 X |
| 5,402,287 | * 3/1995 | Shimizu et al. | 360/78.14 |
| 5,831,787 | * 11/1998 | Yoshida et al. | 360/78.14 X |
| 5,844,744 | * 12/1998 | Suzuki et al. | 360/78.14 X |

OTHER PUBLICATIONS

Patent Abstract of Japan vol. 15. No. 71, Kaneko, Magnetic Head Positioning Control Method, Feb. 19, 1991.

* cited by examiner

*Primary Examiner*—Andrew L. Sniezek

(57) ABSTRACT

A data storage apparatus includes a servo controller (160) coupled to an actuator (190). The servo controller (160) provides control command signals to the actuator (190) to move a head from an initial position to a final position at a discrete time interval. A method of moving at least one head of a disk drive is also provided. The method includes the step of moving the head from an initial track to a final track without utilizing a separate track acquisition operation to position the head over the final track.

30 Claims, 6 Drawing Sheets

METHODS AND DEVICES FOR CONTROLLING A HEAD POSITION ACTUATOR OF A DISK DRIVE

FIELD OF THE INVENTION

The present invention relates generally to control systems. More particularly, the present invention relates to methods and devices for controlling a head position actuator of a disk drive.

BACKGROUND OF THE INVENTION

Disk drives are widely used for retrieving and/or storing a variety of information (i.e., audio, computer, and video data). A disk drive typically includes one or more circularly shaped disks mounted on a shaft or spindle. The disks are rotated by the shaft at a high rate of speed for recording and reproducing data.

Each of the disks is usually divided into a plurality of concentric tracks. The concentric tracks of the disks are arranged on the upper and lower surfaces of the disks with varying radii. The concentric tracks are identified through servo information located on each track or a dedicated servo disk.

The disk drive usually includes one or more transducers or heads associated with each surface of the disks. The heads are moved across the surfaces of the disks by an actuator. The actuator positions the heads over a selected track of the disks to access the information recorded on the selected track or to write data to the selected track.

The process of moving the heads of a disk drive from a present track to a selected track is known as a seek, while maintaining the heads over the center of the selected track during a read or write operation is referred to as track following. During a seek operation, the heads are usually moved as rapidly as possible from the present track to the selected track in order to minimize seek time.

One method of minimizing seek time is to apply a maximum control signal to the actuator to accelerate the heads as fast as possible to a halfway point. At this point, an opposite control signal is applied to the actuator to decelerate the heads to the desired track. This is referred to as a "bang—bang" technique. However, variations in the control signals, the supply voltage, the gain of the actuator, the environment surrounding the drive, and the mechanical characteristics of the disk drive can cause the heads to overshoot or undershoot the selected track. Consequently, it can be quite difficult to accurately move the heads from one track to another in a seek operation utilizing "bang—bang" techniques.

Known disk drives typically utilize a velocity profile when moving the heads of a disk drive from a present track to a selected track. As the heads are moving to the selected track, the velocity profile is followed as closely as possible during acceleration and deceleration of the heads. In particular, the velocity of the heads is estimated at various points and compared to the required velocity profile to generate an error signal. The error signal is provided to the actuator to correct the difference between the estimated velocity and the required velocity profile of the heads. When the required velocity profile is greater than the estimated velocity, the heads are accelerated. When the required velocity profile is less than estimated velocity, the heads are decelerated. The estimated velocity is compared to the velocity profile until the heads reach the selected track.

However, the use of a velocity profile may not assure that the desired track will be reached in a minimum amount of time. First, the velocity profile usually does not account for the discrete times at which command updates can be made to the actuator. Therefore, it can be difficult to force the required control actions to coincide with the command update times. As a consequence, the command signals are usually applied to the actuator for a longer or shorter period of time than required. This can result in an error of the final state (i.e., an overshoot, an undershoot or arrival at a different final state).

Second, the velocity profile usually does not assure zero velocity and position error at a desired track at a sampling time of the system. As a result, there will be residual errors that are usually eliminated by another operation (i.e. a track acquisition operation) before the seek can be completed. The time needed to reduce the residual errors to acceptable levels can typically require several sample times of the system. Thus, the time required to dampen out the residual errors increases the total time for a seek. Finally, unaccounted changes in the parameters of the system can force a velocity profiling system to overshoot or undershoot the desired target track.

SUMMARY OF THE INVENTION

The present invention relates to methods and devices for controlling a head position actuator of a disk drive. A controller is utilized to control the actuator to allow seek operations to be performed in the shortest time possible allowed by the dynamics of the actuator and the sampling and control update rates of the system. The controller can accurately and quickly cause a head of disk drive to move to a selected track of a disk with minimal overshoot or undershoot.

The head can meet specific states at particular quantizied time intervals. The head can be moved from an initial state to a final state (i.e., position, velocity, and acceleration) in a minimal number of sampling or control update time intervals (i.e., servo bursts). A set of control/command signals is generated to cause the head or actuator to change from an initial state to an intermediate state or a reachable set of states. From the intermediate state, control/command signals are generated to ensure that the head arrives at the desired position or track with approximately zero velocity and acceleration error in a minimum amount of discrete sampling or control update time intervals.

The head can reach the final state with near zero state error at a specific sampling or control update time, despite uncertainty in the gain and other parameters of the actuator. The final state may be selected to coincide with a sample time of the system or a control update time.

One device in accordance with the present invention comprising an actuator to move a head of a data storage apparatus. A servo controller is coupled to the actuator and provides control command signals to the actuator to move the head from an initial position to a final position at a discrete time interval.

One method in accordance with the present invention comprising the steps of moving the head from an initial track to a final track without utilizing a separate track acquisition operation to position the head over the final track.

The invention, together with attendant advantages, will best be understood by reference to the following detailed description of the presently preferred embodiment of the invention, taken in conjunction with the accompanying drawings.

DETAILED DESCRIPTION OF A PREFERRED EMBODIMENT

Before explaining the present invention in detail, it should be noted that the invention is not limited in its application or use to the details of construction and arrangement of parts illustrated in the accompanying drawings and description, because the illustrative embodiments of the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limitation.

Figure 1:
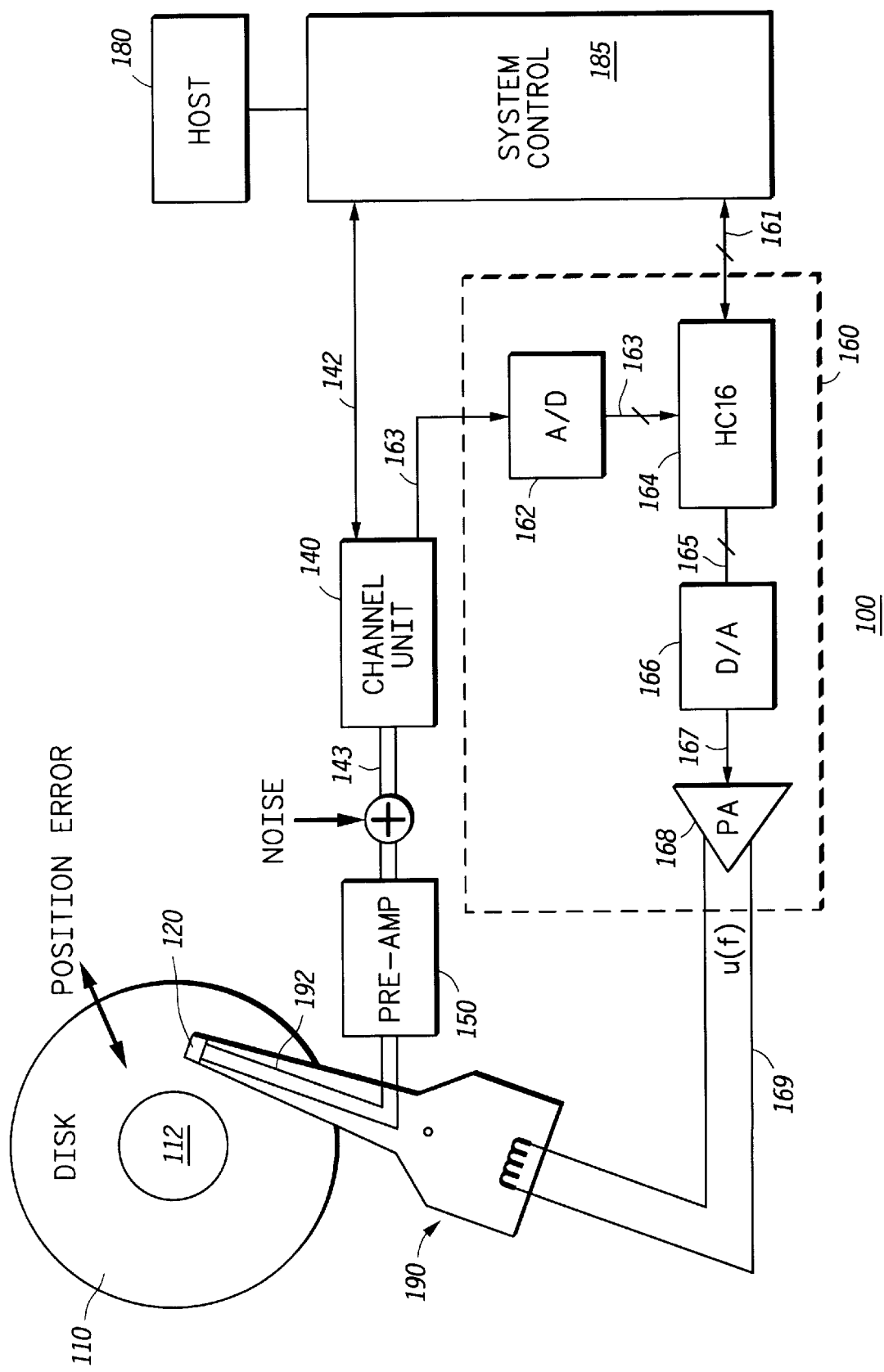
FIG. 1 is a block diagram of a system for controlling a head of a disk drive.

Referring now to the drawings, FIG. 1 illustrates a block diagram of a system 100 for controlling a head of a disk drive. The system 100 can control a head position actuator or motor to change the head or the actuator from an initial or first state to a final or desired state (i.e. position, velocity and acceleration) in a minimal number of sampling or control update time intervals. The head can reach the final state with near zero state error at a specified sampling or control update time interval, despite uncertainty in the parameters of the system.

The head of the disk drive can be changed from the first state to an intermediate state or reachable set of states at a discrete sampling or control update time interval. When the head reaches the intermediate state, control/command update signals are generated to change the head from the intermediate state to the final state in a minimum number of sampling or control update time intervals.

As shown in FIG. 1, the system 100 preferably includes one or more information disks 110, one or more heads or pick-up units 120, a channel unit 140, a pre-amp 150, a drive unit 160, and a head position actuator 190. A system controller 185 provides commands to the drive unit 160 and the channel unit 140.

One or more of the heads 120 of the system 100 can collect servo data. The servo data is processed by the pre-amp 150 and channel unit 140 to generate a set of signals indicative of the position of the heads 120 over the surface of the disks 110. These signals are converted to a digital format and processed by the drive unit 160 according to the commands issued by the system controller 185. The signals are converted back into analog signals and are amplified by the drive unit 160. The signals are applied to the actuator 190 to adjust the current in the actuator to force a change in the position of the heads 120.

The disks 110 are mounted on a shaft or spindle 112 which is driven by a drive motor (not shown). The disks 110 may be rotated at about 4000–7000 revolutions per minute (RPM). As the disks 110 are rotated, one of the heads 120 collects and processes the data stored on the surface of the disks 110 or writes data to the disks.

Figure 2:
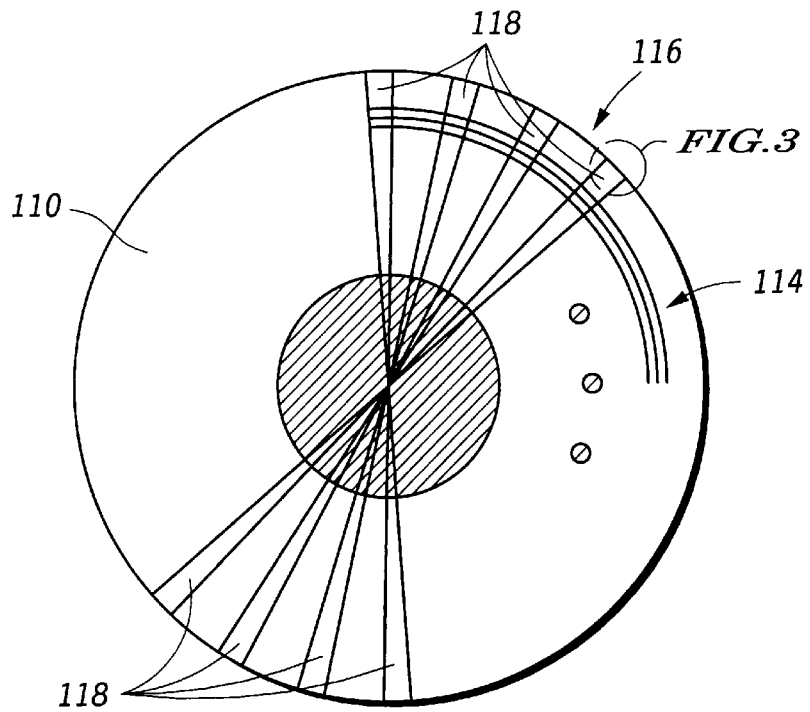
FIG. 2 is a diagrammatical view of a disk of the system of FIG. 1.

As shown in FIG. 2, the disks 110 preferably include a plurality of concentric tracks 114 arranged on the upper and lower surfaces of the disks 110 with varying radii. It will be recognized that the disks 110 may have a single continuous spiral track. The disks 110 may be magnetic disks, optical disks, magnetic-optical disks, or any other suitable disks or recording media.

The tracks 114 of the information disks 110 are divided into radial sectors. The radial sectors preferably contain data sectors 116 and identification sectors, such as, for example, servo information or servo bursts 118. The servo bursts 118 are angularly spaced and interspersed at various radial sectors on the disks 110. At approximately every 100–200 $\mu s$, a servo burst passes under the heads. The servo bursts 118 are utilized to determine the position of the heads 120 and to maintain the heads 120 over the center of a desired or selected track. The heads 120 preferably detect about 60–90 servo bursts per revolution. It is contemplated that the servo bursts or information may be alternately located on a dedicated servo disk or surface.

Figure 3:
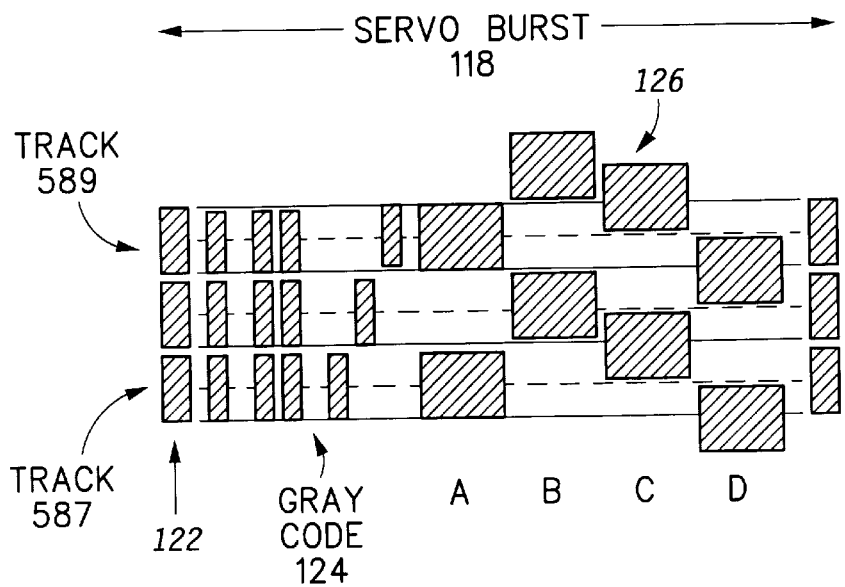
FIG. 3 is an enlarged diagrammatical representation of an exemplary pattern of a servo burst of the disk of FIG. 2.

FIG. 3 shows an enlarged diagrammatical representation of an exemplary pattern of the servo burst 118 for track numbers 587, 588 and 589 of the disks 110 of FIG. 2. When the disks 110 are rotated, one of the heads is selected to detect servo bursts from a track of the disks 110 and to generate a servo signal representing the servo bursts 118. Each servo burst preferably includes a sync pulse 122, a gray code 124, and head position bursts 126.

The sync-pulse 122 of the servo bursts 118 is utilized to identify the beginning of a servo burst on a selected track of the disks 110. The synch-pulse 122 may also synchronize the recovery of subsequent signals. The gray code 124 of the servo bursts 118 represents the track number of the disks 110.

The head position bursts 126 of the servo bursts 118 include a plurality of signals (i.e., A, B, C, D). As the servo bursts pass under the heads, the head position bursts 126 are detected and processed by the pre-amp 150 and channel unit 140 to generate a set of voltages. These voltages are proportional to the fraction of the pattern over which a selected head passes.

The active sensing region of the selected head is approximately the width of a track. For example, if the selected head is centered over track 589, the A signal will be a maximum, the B signal will be a minimum, and the C and D signals will be equal and near half maximum. If the head moves slightly closer to track 588, the A signal will be slightly smaller than maximum, the B signal will be slightly increased from a minimum, the C signal will be slightly less than half maximum, and the D signal will be slightly larger than half maximum. The decrease/increase in C and D will be proportional to the area of the bursts intersected by the selected head. By subtracting D from C, a signal proportional to the head position error (i.e., fractional track error position) from track center can be determined. By adding the gray code signal representing the track number 589, the system can recover an absolute head position (track number plus a fractional track) over the disk. This processing is carried out every time the servo burst signal passes under the selected head.

Referring again the FIG. 1, a host computer 180 controls the overall operation of the system 100. The host computer 180 generates requests or commands that are provided to the system controller 185. The system controller 185 provides commands or requests to the channel unit 140 and drive unit 160 to perform various operations.

The channel unit 140 of the system 100 receives requests or commands over a line 142 from the system controller 185 to perform various data transfer operations, such as, for example, read and write operations. The channel unit 140 also collects signals indicative of a servo burst from the pre-amp 150 at discrete time intervals over a line 143. The channel unit 140 processes the servo bursts 118 to generate a signal indicative of the position of the heads 120 on the disks 110 or the state of the actuator. The servo bursts are preferably observed or sampled only at discrete time intervals, nTi (where n is an integer). It is also contemplated that the channel unit 140 may also provide the velocity and/or the acceleration states of the actuator or head.

The channel unit 140 may also generate distance information indicative of the remaining distance to a desired track based upon a servo burst that represents the present position of the heads 120. The channel unit 140 may include a 32P4915A P.R.M.L. Read Channel available from Silicon System Inc. It is contemplated that the channel unit 140 may be any suitable device to detect information or data from the heads.

The drive unit 160 of the system 100 receives requests or commands from the system controller 185 over line a 161 to perform various operations, such as a seek. The drive unit 160 also receives signals indicative of the state or position of the head 120 from the channel unit 140. The drive unit 160 utilizes a control algorithm, as further described below, to generate control/command update signals u(t) at discrete points in time nT2 over a line 169. The control/command update signals are provided to the actuator 190 of the system 100 to control the state or movement of the heads 120.

During a seek operation, the drive unit 160 provides control/command update signals to cause the actuator or heads to reach a final state (i.e., position, acceleration, and velocity) in a minimal number of discrete time intervals with near zero state error. The final state preferably corresponds to a sampling time of a servo burst or a control update time interval. The final state can be a zero state or any other suitable state. The final state may be inputted into the system 100 by a user or operator, or may be read from a storage device.

The drive unit 160 preferably provides control/command update signals to the actuator 190 to move the head 120 from a first or initial state to an intermediate or reachable set of states at a discrete point in time nT (where n is an integer and T is a discrete time interval which may correspond to the sampling time T1 or control update time T2). The intermediate state may be a range of position, velocity, and/or acceleration states. The intermediate state is preferably reached at no more than N time intervals from the final state. When the head 120 is moved a short distance (i.e. 1–20 tracks) the intermediate position state may be the same as the first position state or may be approximately halfway between the first position state and the final position state depending on actuator dynamics of the system.

The control/command update signals that move the head from the first state to the intermediate state may be derived based upon a seek profile. The seek profile may represent the acceleration of the head verses time, the velocity of the head verses time, the position of the head verses time, and/or any other suitable seek profile. The seek profile may generated off-line to develop a table of control/command update signals for various seek lengths. The seek profile for various seek lengths may be tabulated and stored in a storage device or memory device. The seek profile may be addressable as a function of the length of the seek (i.e., number of tracks to move) or the number of tracks to the intermediate state. It is contemplated that the seek profile may also be developed on-line.

The control/command update signals of the seek profile can move the head to the intermediate state or reachable set of states in the minimum amount of discrete sampling or control update time intervals allowed by the system dynamics. For example, a "bang—bang" profile may be used to accelerate the head or actuator as fast as possible to an intermediate position state at approximately half-way between the initial and final state. At the intermediate position state, the head or actuator may be decelerated as fast as possible from the intermediate position state to the final state. It will be recognized that any suitable command signals may be employed to move the head to the intermediate state or reachable set of states.

The drive unit 160 of the system 100 may generate control/command update signals that are used to correct for the deviation between the actual or measured state and the desired state of the head according to the seek profile. The deviation between the present state and the intermediate state may be used to assure the heads arrive at the intermediate state at a discrete sampling or control update point in time. It is contemplated that any suitable control methods can be utilized to manage the transition from the initial state to the intermediate state or reachable set of states.

From the intermediate state, the drive unit 160 provides control/command update signals to move the head or actuator to the final state at (nT+mT) in a minimum amount of discrete time intervals (where mT is the minimum number of discrete time intervals required to reach the final state from the intermediate state). At the final state, the state error will be approximately zero. To optimize changing the head or actuator between the intermediate state and the final state, the intermediate state may be determined based upon reaching the final state with maximum control parameters after accounting for the effects of system parameter variables, as further described below.

As shown in FIG. 1, the drive unit 160 preferably includes an analog to digital (A/D) converter 162, a controller or compensator 164, a digital to analog (D/A) converter 166, and an amplifier (PA) 168. It will be recognized that the drive unit 160 may be implemented utilizing any suitable hardware components and circuitry designs, computer programming, or a combination thereof.

The A/D converter 162 of the drive unit 160 receives analog signals from the channel unit 140 on a line 163 that correspond to the position information of the servo bursts of the disks. The A/D converter 162 converts the analog position signals into digital position signals. The A/D converter 162 provides the digital position signals on one or more lines 163 to the controller 164.

The controller 164 of the drive unit 160 receives the digital position signals from the A/D converter 162 and provides command signals on one or more lines 165 to the input of the D/A converter 166. The controller 164 may comprise a microprocessor, such as, for example, 68HC11 available from Motorola. The controller 164 may be commanded with any suitable software to carry out the functions described above and further described below. The software can be written in assembly language, C language, or any other suitable programming language. It will be recognized that the controller 164 may be any suitable device that can provide appropriate control signals to control the operation of the actuator.

The D/A converter 166 of the drive unit 160 converts the command signals generated by the controller 164 to corresponding analog voltage or current command signals. The analog voltage or current command signals are supplied from the output of the D/A converter 166 to an input of an amplifier 168 via line 167. It will be recognized that the D/A converter 166 may be part of an integrated circuit device which may also include the controller 164 and the A/D converter 162.

The amplifier 168 of the drive unit 160 amplifies the analog voltage or current command signals from the D/A converter 166 by a desired or predetermined gain. The amplifier 168 supplies control/command update signals to drive the actuator 190. Preferably, the amplifier 168 is a transconductance type power amplifier that converts the analog voltage command signals to current control command signals.

The actuator 190 of the system 100 receives the control/command update signals from the amplifier 168. The actuator 190 preferably includes an armature or carriage 192 which carries the heads 120 of the system 100. The control/command update signals applied to the actuator 190 generate a force (i.e. torque) which is preferably proportional to acceleration of the armature 192 or heads 120. The actuator 190 may be a rotary type or a linear type of actuator. The actuator 190 is preferably a voice coil motor (VCM) which includes a coil movable through the magnetic field of a permanent magnet. It is contemplated that the actuator 190 may comprise any suitable actuator to move the heads 120.

The combination of the actuator 190 and the amplifier 168 of the system 100 is preferably modeled as at least a partially controllable and at least a partially observable Nth order continuous linear system. The states of the actuator 190 and the amplifier 168 system are preferably observed or sampled at discrete time intervals at time, $nT_1$, and the control/command update signals u(t) are preferably changed at discrete time intervals at time, $nT_2$, (where n is an integer and $T_1$ and $T_2$ are fixed time increments). It is contemplated that rate of the control/command update signals $T_2$ may correspond to the rate at which servo information is sampled or received $T_1$.

The states of the actuator 190 and the amplifier 168 system are changed so that the state of the system equals specific values at particular discrete points in time, (i.e., $nT_1$ or $nT_2$). It will be recognized that all of the states of the actuator 190 and the amplifier 168 may not be observable or controllable, and the actuator 190 and amplifier 168 system may be a non-linear system.

When the actuator 190 is energized by the control/command update signals, the armature 192 can move the heads 120 over the surface of the disks 110 to a desired position. During a seek operation, the actuator 190 can rapidly move the heads 120 from an initial track to a desired or final track in the minimum amount of discrete time intervals allowed by the dynamics of the actuator 190 and amplifier 168. The actuator 190 preferably moves the heads from a first state to a second or intermediate state at a predetermined time interval (nT), (where T may equal $T_1$ or $T_2$).

From the intermediate state, one or more control/command update signals are applied to the actuator 190 to move the heads to the final state or track as described further below. The heads 120 can reach the final state or track with near zero state error at a discrete point in time $(n+m)T$ (where T may equal $T_1$ or $T_2$), despite uncertainty in the gain and other parameters of the actuator 190 and the amplifier 168.

Figure 4:
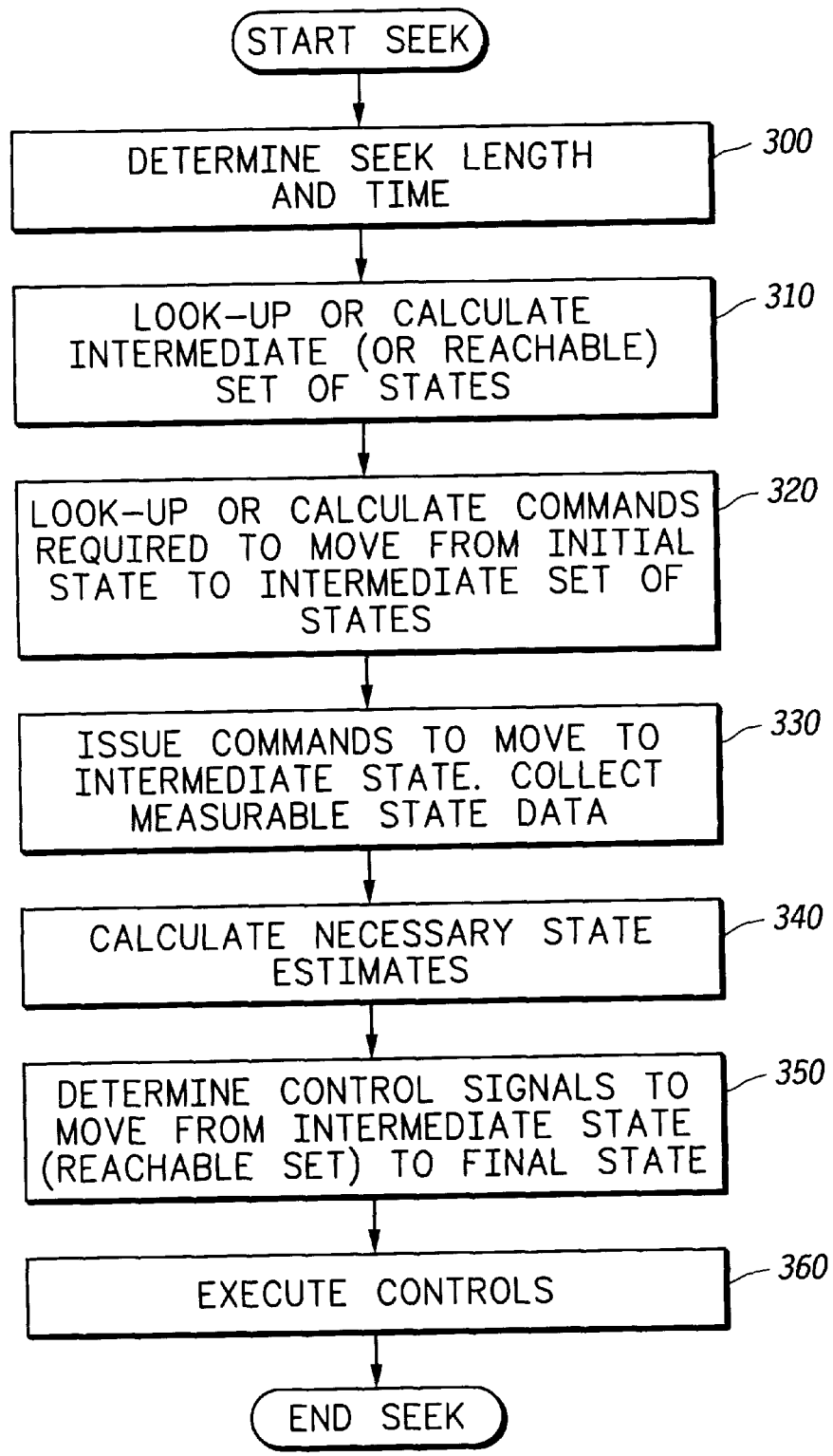
FIG. 4 is a flow diagram of an exemplary seek operation with no compensation for parameter variations.

Referring now to FIG. 4, a flow diagram of an exemplary seek operation with no compensation for parameter uncertainty or variations of the system of FIG. 1 is illustrated. The seek operation can change the state of the actuator or the heads from an initial state to an intermediate state or reachable set of states in nT (where T may equal $T_1$ or $T_2$) time intervals. The value of nT can be the minimum time allowed by the dynamics and the sampling or update rates of the system for the heads to reach the intermediate state.

From the intermediate state, the seek operation can change the state of the actuator or the heads to a final state in a minimum number of discrete time intervals mT (where T may equal $T_1$ or $T_2$). The value of mT is preferably the minimum time allowed by the dynamics and the sampling or update rates of the system for the heads to reach the final state. Since the transitions from the initial state to the intermediate state and from the intermediate state to the final state can be accomplished in a minimum number of discrete time intervals, the overall seek can be accomplished in the minimum time allowed by the system.

The actuator or system may be represented or modeled by the following equation:

$$\dot{x}(t) = Ax(t) + Bu(t) \qquad (1)$$

where $\dot{x}(t)$ is a time derivative of the state vector;

x(t) is an N×1 state vector;

u(t) is a 1×1 control/command update signal;

A is an N×N matrix determined from the characteristics of the actuator; and

B is an N×1 matrix determined from the characteristics of the actuator.

As shown in FIG. 4, the seek length and time is determined at block 300. From the seek length, the number of discrete time intervals, nT, to reach an intermediate state from an initial state is determined. The number of discrete time intervals may be determined by a look-up table or may be calculated, or a combination thereof.

At block 310, the intermediate state (i.e., reachable set of states) are determined. The intermediate state may be calculated or may be determined by a look-up table or a combination of both. At block 320, a set of control/command update signals are determined which will move the actuator or heads from the initial state to the intermediate state. The control/command update signals may also be calculated or determined from a look-up table. It is contemplated that any suitable control method may be employed which will cause the actuator or heads to move from the initial state to the intermediate state.

Since the intermediate state is preferably a set of states, or an N dimensional target region, the controller can be designed to attain this target region at a specific point in time nT. As a result, the design of the controller can be simplified because a finite error is allowed in a particular point in time.

At block 330, the control/command update signals are applied to the actuator to move the actuator or heads from the initial state to the intermediate state. During this state transition, the available state data is sampled and stored. At block 340, the collected state data is processed to determine or estimate all other required or necessary states. The required states are those states needed to calculate the control/command update signals which can move the actuator or heads from the intermediate state to the final state.

At block 350, the calculated and measured state values are utilized to calculate the control/command update signals required to move the actuator or heads from the intermediate state to the final state. This calculation is an N×N matrix operation expressed by the equation below:

$$\begin{bmatrix} u(nT) \\ u[(n+1)T] \\ u[(n+2)T] \\ \vdots \\ u[(n+(N-1))T] \end{bmatrix} = \begin{bmatrix} G_{1,1} & G_{1,2} & G_{1,3} & \cdots & G_{1,N} \\ G_{2,1} & G_{2,2} & G_{2,3} & \cdots & G_{2,N} \\ G_{3,1} & G_{3,2} & G_{3,3} & \cdots & G_{3,N} \\ \vdots & \vdots & \vdots & & \vdots \\ G_{N,1} & G_{N,2} & G_{N,3} & \cdots & G_{N,N} \end{bmatrix} \begin{bmatrix} x_1(nT) \\ x_2(nT) \\ x_3(nT) \\ \vdots \\ x_N(nT) \end{bmatrix} \quad (2a)$$

An exemplary fourth order equation for N=4 may be expressed as follows:

$$\begin{bmatrix} u(nT) \\ u[(n+1)T] \\ u[(n+2)T] \\ u\{(n+3)T] \end{bmatrix} = \begin{bmatrix} G_{1,1} & G_{1,2} & G_{1,3} & G_{1,4} \\ G_{2,1} & G_{2,2} & G_{2,3} & G_{2,4} \\ G_{3,1} & G_{3,2} & G_{3,3} & G_{3,4} \\ G_{4,1} & G_{4,2} & G_{4,3} & G_{4,4} \end{bmatrix} \begin{bmatrix} x_1(nT) \\ x_2(nT) \\ x_3(nT) \\ x_4(nT) \end{bmatrix} \quad (2b)$$

In equation 2b, x1(nT), x2(nT), x3(nT), and X4(nT) are the values of the state vectors, either measured at block 330 or calculated at block 340. The values u(nT), u[(n+1)T], u[(n+2)T] and u[(n+3)T] are the control/command update signals to be issued at times nT, (n+1)T, (n+2)T and (n+3)T, respectively. The elements $G_{ij}$ are matrices which will be further described below.

Once the control/command update signals, u[(n+i)T] (where i=0(N-1)) are calculated, the control/command update signals are provided to the actuator at the appropriate times to cause the actuator or heads to move from the intermediate state at time nT to the final state at time (n+m)T, (in equation 2b, m=n). After all the required m control/command update signals have been provided to the actuator, the system or heads will be in the desired final state at time (n+m)T.

The control/command update signals may be calculated at various times during a seek operation. For example, the first control value, u(nT), may be calculated from equation 2b and this value may be immediately provided to the actuator. Thereafter, the values for the remaining control/command update signals may be calculated. It will be recognized that any suitable combination or sequence of calculations may be employed.

Figure 5:
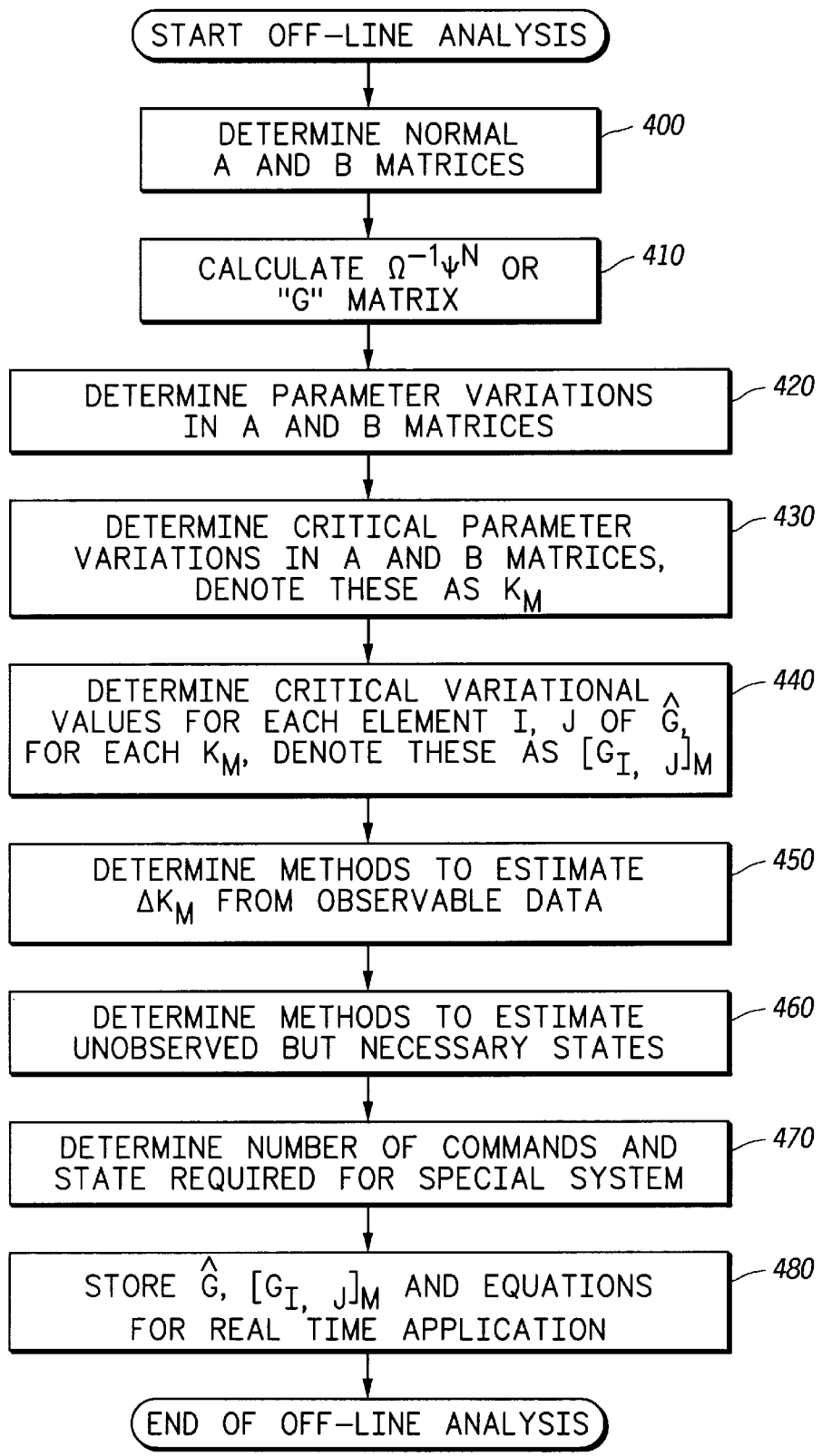
FIG. 5 is a flow diagram of an exemplary process to derive control system elements.
Figure 6:
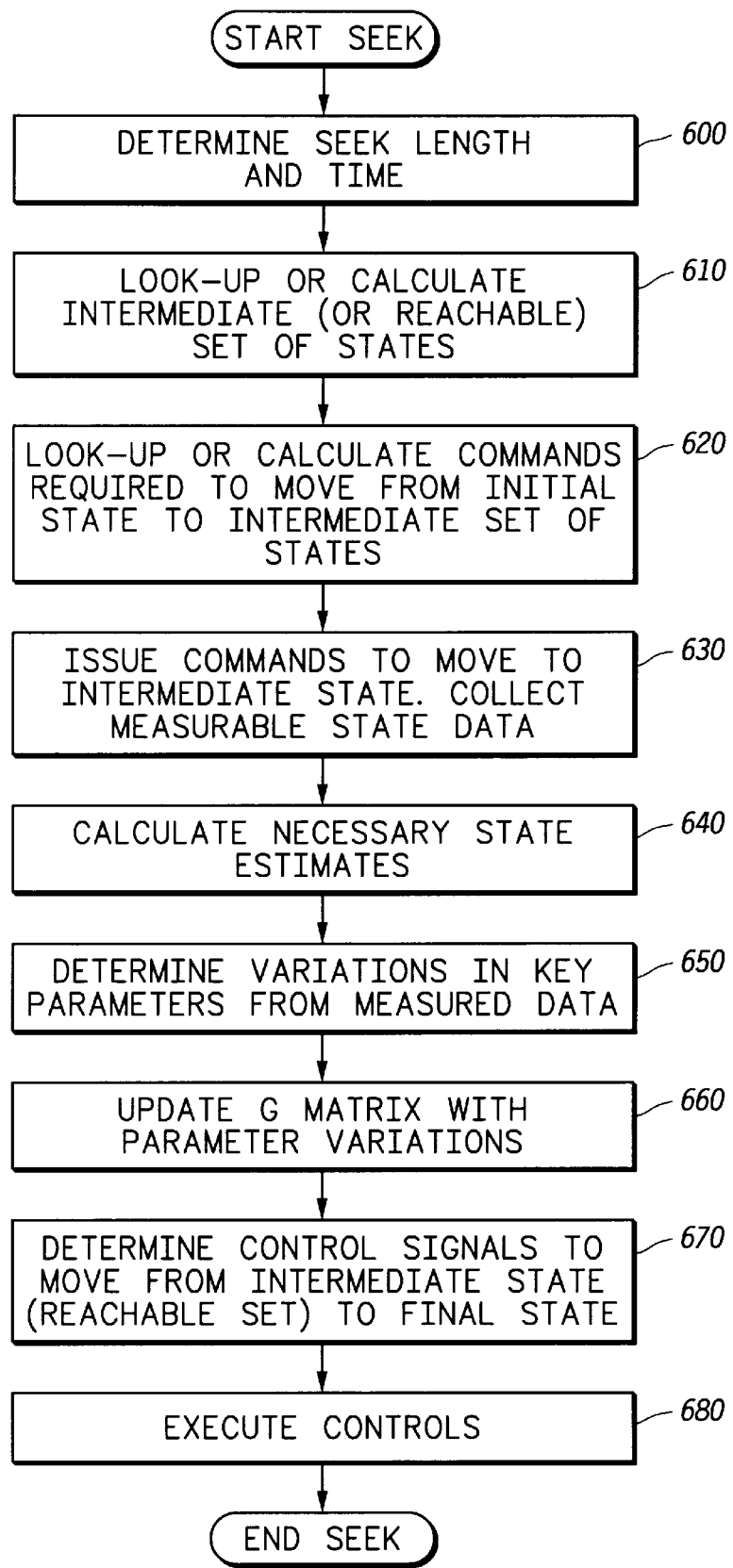
FIG. 6 is a flow diagram of an exemplary seek operation that compensates for parameter variations.

Referring now to FIGS. 5–6, a seek operation to account for parameter variations of the system of FIG. 1 is illustrated. The construction or execution of the seek operation can include both off-line operations and on-line operations. At the outset, a G matrix is calculated from the A and B matrices from equation 1 above, together with the time interval, T, between control/command update signals. The time interval T may be the same as the sampling time or control update rate.

The G matrix can be calculated from the following set of equations:

$$G = \Omega^{-1} \Psi^N x(0) = [u(0); u(T); \ldots u[(N-1)T]] \quad (3)$$

where N is the size of the A matrix.
The matrices Ω and A are given by:

$$\Omega = [\Psi^{N-1} \Gamma \ldots \Omega \Gamma \Gamma]^{-1}. \quad (4)$$

where $$\Psi = L^{-1}\{(sI-A)^{-1}\}|_{t=T}$$

$$\Gamma = \int_{\tau=0}^{T} \Psi(\tau) B \, d\tau$$

where $L^{-1}$ is the inverse Laplace Transform operator; and A and B are the matrices from equation 1.

From equation 3, the control/command update signals may be determined from the G matrix that will force the actuator from an intermediate state to the final state in a minimum number of discrete time intervals, mT, (where m=N and N is the order of the system). In order to account for the parameters in the A or B matrix of equation 1 that are either imprecisely known or vary, the G matrix can be modified to compensate for these perturbations as further described below. If these perturbations are not accounted for, the system may not arrive at the final state at time (n+m)T with zero state error.

It is contemplated that any suitable method may be utilized to determine these parameter variations and to modify the G matrix to account for these changes. In one exemplary embodiment, a variational analysis of the G matrix is utilized to account for the changes or perturbations in critical system parameters as further described below. These critical system parameters are elements of the matrices A and B of equation 1.

Referring now to FIG. 5, a process for off-line operations for a seek operation that accounts for parameter variations is illustrated. At block 400, the nominal values for all elements in the A and B matrices of equation 1 are determined. These nominal values of the A and B matrices may be the mean of a statistical distribution. From the selected nominal values of the A and B matrices, a nominal G matrix or 6 may be determined from equations 3 and 4 at block 410.

At block 420, the variations in the system parameters from the nominal values of the A and B matrices are determined. For example, each actuator built into a hard disk drive typically has a slightly different gain. The mean gain of a particular type of actuator may be selected as the nominal value as described above. As a result, a statistical distribution can be constructed for the actuators. From this statistical distribution, both an expected or nominal value and an estimate of the variations in the particular parameters can be constructed or determined.

At block 430, a variational analysis of the changes in the G matrix as a function of the parameter variations of the A and B matrices of block 420 is determined. The parameter variations that have a substantial impact on the overall system performance are determined. These parameter variations are referred to as $\Delta K_q$ (where q is indexing integer). It will be recognized that not all of the parameters in the A and B matrices may have a significant impact on the overall system performance.

One method for determining the critical system parameter variations is based on a variational method that can be expressed by the following equation:

$$G_{ij} = \hat{G}_{ij} + \sum_q \frac{\partial \hat{G}_{ij}}{\partial K_q} \Delta K_q \quad (5)$$

where $\hat{G}_{ij}$ is the value calculated from equation 3; and
$K_q$ represents variable system parameters.
At block 440, the variational analysis is continued and a functional relationship between the variations in $\Delta K_q$ and the G matrix are catalogued or generated. This parameter relationship is denoted parametrically as $[g_{ij}]_q$. Depending upon the method chosen to estimate a "true" or "actual" G from changes in the system parameters and the nominal G (or $\hat{G}$), the parametric relationship may be any suitable form. One exemplary form is an extension of equation 5 in which a first order linear relationship is assumed and the "true" or "actual" G is calculated from the nominal G (or $\hat{G}$) via the following equation:

$$G_{ij} = \hat{G}_{ij} + \sum_q [g_{ij}]_q \Delta K_q \text{ where } [g_{ij}]_q = \frac{\partial \hat{G}_{ij}}{\partial K_q} \tag{6}$$

In this case, the nominal values of G and the parametric values $[g_{ij}]_q$ are stored. The method or algorithm to generate the "actual" G from the nominal G (or $\hat{G}$), the $[g_{ij}]_q$ and the $\Delta K_q$ is also stored.

It will be recognized that the values of gij may be calculated by any suitable method. For example, the G matrix may be calculated for various combinations and perturbations in each of the $\Delta K_q$ and the changes in the G matrix may be determined as a function of change of the $K_q$. It is contemplated that higher order or non-linear equations may also be employed to estimate G from the $g_{ij}$ and to estimate $\Delta K_q$.

At block 450, methods to estimate the change in the key parameters, $\Delta K_q$, from the observable or collected data are determined. It will be recognized that these relationships may be estimated by any suitable means. One example for estimating $\Delta K_q$ for a fourth order system is described below.

At block 460, a method to estimate the required or necessary states is determined. The method may be based on an observer or estimator design, Kalman filters, or specific equations relating to state variables. It is contemplated that any suitable method may be utilized. An example of estimating the required states for a fourth order system is described below.

At block 470, the number of control/command update signals and the required states for the system are determined. It will be recognized that the number of states used in the calculations of the control may be reduced (i.e., the state vector on the right hand side of equation 2), or the number of outputs required to move from the intermediate to final states may be reduced. As a result, a smaller G matrix may be generated and the resulting number of computations may be decreased. At block 480, $\hat{G}$ and $[g_{ij}]_m$ as well as equations to estimate G from $\hat{G}$ and $[g_{ij}]_q$ are stored.

Referring now to FIG. 6, the on-line process of the seek operation that compensates for parameter variations is illustrated. The functions performed at blocks 600–640 are substantially the same as blocks 300–340 of FIG. 4 as described above.

At block 650, the variations in the key parameters, $\Delta K_q$, are estimated. The parameters are based on the available or measured data and the estimated state vectors. The variations in the parameters are used to update the G matrix at block 660. This can be accomplished via equation 6 as described above. Blocks 670 and 680 are substantially the same as blocks 550 and 560 of FIG. 4.

An exemplary fourth order system (N=4) to carry out the principles of the process of FIGS. 5 and 6 is described below. First, nominal A and B matrices and a nominal G matrix of the system are determined. Next, by simulation and analysis, the parameter variations of the A and B matrices are determined. It was discovered that the actuator gain, K, and the bandwidth and damping of the system were the parameters that have any significant variation of the fourth order system. From equation 5 above, the actuator gain was then determined as the only parameter to have any significant impact on the performance of the system over the range of parameter variations.

Next, a particular method for calculating $\Delta K$ is determined. In this exemplary embodiment, the equation for $\Delta K$ can be expressed as follows:

$$\Delta K = \frac{\hat{K}}{\hat{x}_1(nT)}(x_1(nT) - \hat{x}_1(nT)) \tag{7}$$

where K is the nominal or expected actuator gain (the same as the value used in the appropriate element in the A or B matrix);

$\hat{x}_1(nT)$ is the expected actuator position at time NT; and $x_1(nT)$ is the actual measured value.

Next, the G matrix is simplified. In this embodiment, it was determined that only the position and velocity are needed and the fourth control output was not required. Accordingly, the first three outputs calculated from the nominal or perturbed G matrix provided a sufficiently small state error at time [(n+3)T], from control inputs at times (n+1)T and (n+2)T.

The methods to determine the necessary states are then derived. In this embodiment, only position could be measured. From the position measurements, a method to estimate velocity from the position measurements can be derived. One method to estimate velocity can be expressed by the equation:

$$x_2(nT) = \frac{3x_1(nT)}{2T} - \frac{2x_1[(n-1)T]}{T} + \frac{x_1[(n-2)T]}{2T} \tag{8}$$

By substituting equation 8 into a simplified version of equation 2b, the following systems of equations can be derived:

$$\begin{bmatrix} u(nT) \\ u[(n+1)T] \\ u[(n+2)T] \end{bmatrix} = \begin{bmatrix} G_{1,1} + \frac{3G_{1,2}}{2T} & \frac{-2G_{1,2}}{T} & \frac{G_{1,2}}{2T} \\ G_{2,1} + \frac{3G_{2,2}}{2T} & \frac{-2G_{2,2}}{T} & \frac{G_{2,2}}{2T} \\ G_{3,1} + \frac{3G_{3,2}}{2T} & \frac{-2G_{3,2}}{T} & \frac{G_{3,2}}{2T} \end{bmatrix} \begin{bmatrix} x_1(nT) \\ x_1[(n-1)T] \\ x_1[(n-2)T] \end{bmatrix} \tag{9}$$

By substituting equation 7 into 6, $G_{ij}$ in equation 9 can be expressed as:

$$G_{ij} = \hat{G}_{i,j} + \frac{g_{i,j}\hat{K}}{\hat{x}_1(nT)}(x_1(nT) - \hat{x}_1(nT))$$

The $\hat{G}_{ij}$ and $g_{ij}$ can be stored in memory. Equations 9 and 10 described above can be programmed and stored for use during real-time operations.

During on-line operations, the length of the seek is initially determined. From this seek length, the number of discrete time intervals, nT, is determined. The intermediate state is then determined and the control/command update signals to move the actuator from the initial state to the intermediate state are derived.

The control/command update signals are then applied to the actuator of the system to move the actuator or heads from the initial state to the intermediate state. During this state transition, the available state date is sampled and stored. The collected state data is processed and all other necessary states are determined (i.e., velocity).

The variations of the key parameters ΔK are determined based upon the measured data and estimated state vectors. The variation in the parameters are used to update the G matrix.

Next, the control/command update signals to move the actuator or heads from the intermediate state to the final state are calculated. The control/command update signals are then provided to the actuator to move the actuator from the intermediate state to the final state.

Referring now to FIG. 7, an exemplary double integrator system to correct for parameter variations is illustrated to further facilitate an understanding of the present invention. The matrices of the double integrator system represented by equation 1 can be expressed as follows:

$$A = \begin{bmatrix} 0 & 0 \\ 0 & 1 \end{bmatrix} B = \begin{bmatrix} 0 \\ K \end{bmatrix} \text{ and } x(t) = \begin{bmatrix} \text{position}(t) \\ \text{velocity}(t) \end{bmatrix}$$

where K represents the actuator gain term which is constant, but unknown over the time period of the seek. It is assumed that due to the length seek requested, that two sampling/update periods are required to move the actuator to approximately half way to the final position, with a near maximum control/command update signals.

Figure 7A:
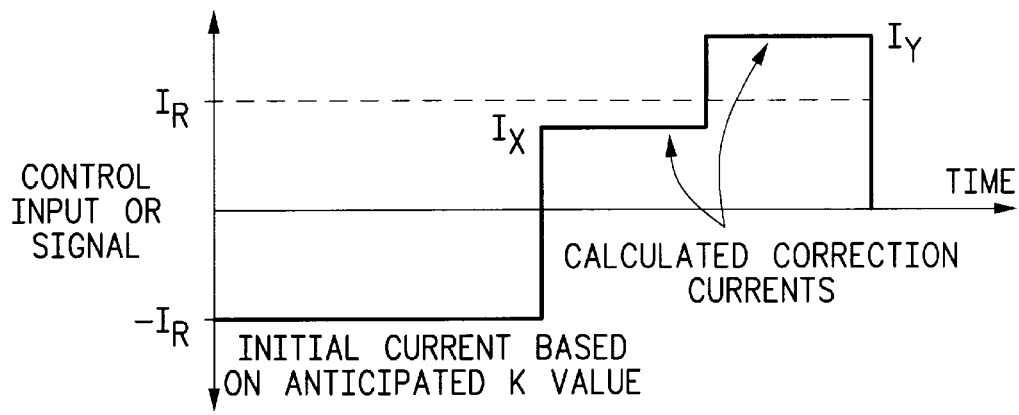
FIGS. 7a–c are exemplary graphical representations of a family of curves of the system of FIG. 1.
Figure 7B:
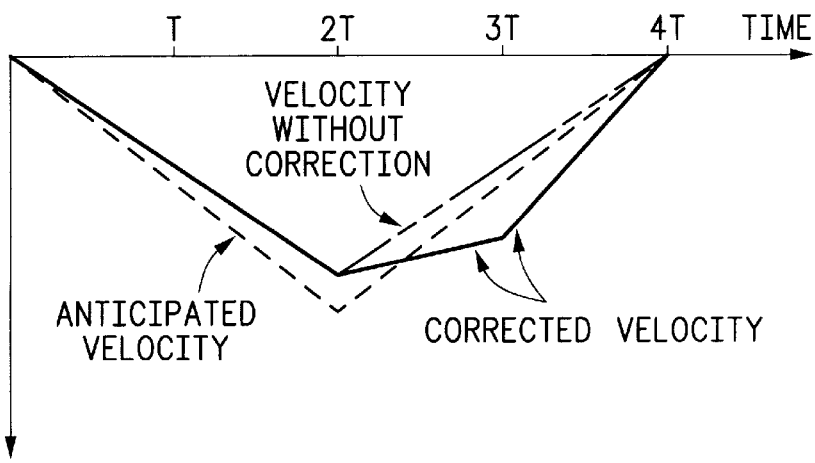
Figure 7C:
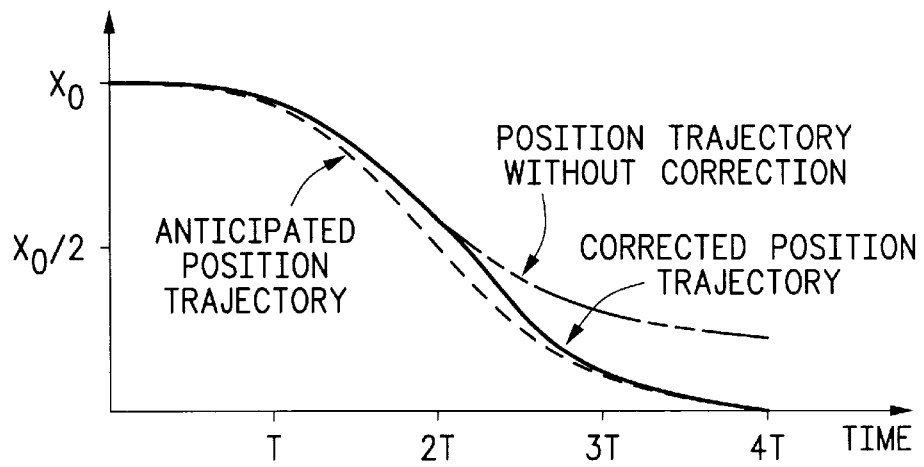

The control/command update signals that are provided by the controller are illustrated in FIG. 7a. The control/command update signals can be proportional to the acceleration of the system. FIG. 7b illustrates the velocity of the actuator, which may be the integration of acceleration times the gain (K) of the actuator. FIG. 7c is the position of the actuator.

Initially, the system receives a request for a seek. The system next determines the length of the seek. In this embodiment, length of the seek will require n=2 and m=2 so that the seek will be completed at 4T. From this information, the system either looks-up or calculates an initial current Ir to move the actuator to the intermediate state at 2T. This initial current flow is based on an anticipated value for the forward gain (K) of the system and time interval 2T. It is assumed that for this example the anticipated value is higher than the actual (i.e., unknown) K. As a result of a lower than anticipated K, the velocity and position of the system at the intermediate state are both lower than anticipated (See FIGS. 7b and 7c).

Position data is collected at times T and 2T. From the collected position data, the system at time 2T generates an estimate to K which preferably information, the system either looks-up or calculates an initial current Ir to move the actuator to the intermediate state at 2T. This initial current flow is based on an anticipated value for the forward gain (K) of the system and time interval 2T. It is assumed that for this example the anticipated value is higher than the actual (i.e., unknown) K. As a result of a lower than anticipated K, the velocity and position of the system at the intermediate state are both lower than anticipated (See FIGS. 7b and 7c).

Position data is collected at times T and 2T. From the collected position data, the system at time 2T generates an estimate to K which preferably reveals that K is lower than initially anticipated. Based on this result, the system calculates two new output current values, Ix and Iy, which will bring the system velocity to zero at 4T and ensure that the position error is zero at time 4T.

The acceleration of the actuator is readily forced to zero at time 4T by simply turning off the current flow at time 4T. Since the actuator may be less than half the distance at time 2T, the system can decelerate at a slower rate over the time period 2T to 3T to allow the position error to be reduced, and can decelerate at a higher than initial value over the 3T to 4T time period in order to obtain zero velocity error at time 4T.

The methods and devices of the embodiments described above allow seek operation to be performed in the shortest time allowed by the dynamics of the actuator and the sampling and control updates of the system. The methods and devices can quickly and accurately cause a head of a disk drive to move to a selected track of a disk with minimal overshoot or undershoot.

The head can be moved from an initial state to a final state in a minimum number of sampling or control update intervals. The head can reach the final state with approximately zero state error at a specific sampling or control update time, despite uncertainty in the gain and other parameters of the actuator.

Although the present invention has been described in detail by way of illustration and example, it should be understood that a wide range of changes and modifications can be made to the preferred embodiments described above without departing in any way from the scope and spirit of the invention. Thus, the described embodiments are to be considered in all respects only as illustrative and not restrictive, and the scope of the invention is, therefore, indicated by the appended claims rather than the foregoing description. All changes that come within the meaning and range of equivalency of the claims are to be embraced within their scope.

What is claimed:

1. A method of moving a disk drive head, comprising the steps of:

rotating a disk having servo information;

determining an intermediate state based on a seek length;

determining a first number of discrete time intervals based on the seek length, wherein the first number of discrete time intervals corresponds to a first time to reach an intermediate state from an initial state;

determining a first set of command signals for moving the disk drive head to the intermediate state, wherein the first set of command signals is a function of at least one characteristic of an actuator;

applying the first set of command signals to the actuator to move the disk drive head to the intermediate state, the disk drive head having a non-zero velocity at the intermediate state;

reading the servo information from the disk at a discrete time interval;

determining a second number of discrete time intervals, wherein the second number of discrete time intervals corresponds to a second time to reach a final state from the intermediate state;

determining a second set of command signals as a function of the servo information, further characterized by:

generating a first matrix of state vectors, each state vector representing at least one parameter selected from position, velocity, and acceleration of the disk drive head;

generating a second matrix of values corresponding to at least one characteristic of the actuator, wherein the first and second matrices form a series of equations describing actuator motion with respect to the disk; and generating control update signals as a function of the first and second matrices, wherein the control update signals force the actuator from the intermediate state to the final state within the first number of discrete time intervals and with zero state error; and applying the second set of command signals to the actuator to move the disk drive head from the intermediate state to the final state without stopping prior to arriving at the final state; and wherein the actuator moves from the initial state to the intermediate state within the first number of discrete time intervals; and wherein the actuator moves from the intermediate state to the final state within the second number of discrete time intervals.

2. The method of claim 1 wherein the intermediate state is no more than N discrete time intervals from the final state where N is the order of the actuator, where the order of the actuator is the number of variables in the first matrix and the variables correspond to at least one actuator parameter selected from supply voltage, actuator gain, and mechanics of the disk drive head, and wherein the disk drive head is in motion at all times while traversing from an initial state to the intermediate state and to the final state.

3. The method of claim 2 wherein the second number of discrete time intervals is a function of the order of the actuator.

4. The method of claim 1 further comprising the step of maintaining the disk drive head at the final state for a predetermined time and wherein the disk drive head is at a first stopping point with substantially zero position error when at the final state.

5. The method of claim 1 wherein the second set of command signals have maximum values and wherein the disk drive head has zero velocity and zero acceleration at the first stopping point and the first stopping point is at a switching time.

6. The method of claim 3 wherein the second matrix is an N×N matrix.

7. The method of claim 1 wherein the disk drive head arrives at the final state at least one discrete time interval after arriving at the intermediate state and wherein when the actuator is at the intermediate state, further comprising determining actuator commands based on a desired position at the final state and based on dynamics of the actuator.

8. The method of claim 7 wherein the discrete time interval corresponds with a sample time interval and a control update time interval.

9. The method of claim 1 wherein the final state comprises a set of states.

10. The method of claim 1 further comprising the step of collecting state data.

11. The method of claim 1 wherein the intermediate state is at least one discrete time interval from the initial state.

12. A system for controlling the position of a disk drive head, comprising:
an adapter for receiving a rotatable data storage disk having a plurality of annular data tracks for storing data;
a disk drive head;
an actuator for moving the disk drive head to a track of the rotatable data storage disk;
control circuitry, operatively coupled to the actuator, generating a first set of command signals for moving the disk drive head from an initial state to an intermediate state within a first number of discrete time intervals based on a seek length, and generating, based on a track position signal, a second set of command signals for moving the disk drive head from the intermediate state to a final state within a second number of discrete time intervals based on an order of the actuator, where the order of the actuator is the number of variables corresponding to at least one actuator parameter selected from supply voltage, actuator gain, and mechanics of the disk drive head; and an estimator, operatively coupled to the disk drive head, for generating the track position signal as a function of the position of the disk drive head; and wherein actuator motion is determined by a series of equations defining control update signals, the series of equations comprising:
a first matrix of state vectors, each state vector representing at least one parameter selected from position, velocity, and acceleration of the disk drive head;
a second matrix of values corresponding to at least one characteristic of the actuator, wherein the first and second matrices form a series of equations describing actuator motion with respect to the disk; and
control update signals as a function of the first and second matrices, wherein the control update signals force the actuator from the intermediate state to the final state within the second number of discrete time intervals.

13. The system of claim 12 wherein the disk drive head has non-zero velocity at all times while moving from the intermediate state to the final state; and wherein the control circuitry is adapted to:
generate the first matrix of state vectors;
generate the second matrix of values; and
generate the control update signals.

14. The system of claim 13 wherein the second matrix is an N×N matrix, where N is the order of the actuator and the order of the actuator is the number of variables in the first matrix, wherein the variables describe the actuator using at least one parameter selected from supply voltage, actuator gain, and mechanics of the disk drive head.

15. A method of moving a head of a disk drive to a selected track of a disk comprising the steps of:
determining a first number of discrete time intervals based on a seek length, wherein the first number of discrete time intervals corresponds to a first time to reach a selected state from a first state;
determining a second number of discrete time intervals, wherein the second number of discrete time intervals corresponds to a second time to reach a final state from the selected state;
determining a series of equations defining control update signals, the series of equations comprising:
a first matrix of state vectors, each state vector representing at least one parameter selected from position, velocity, and acceleration of the disk drive head;
a second matrix of values corresponding to at least one characteristic of the actuator, wherein the first and second matrices form a series of equations describing actuator motion with respect to the disk; and
control update signals as a function of the first and second matrices, wherein the control update signals force the actuator from the selected state to the final state within the second number of discrete time intervals;
moving the head from a first state to the selected state based on the control update signals; and
moving the head from the selected state to the final state based on the control update signals, the final state being at a discrete time interval, the head of the disk drive having a non-zero velocity at the selected state.

16. The method of claim 15 further comprising the steps of:
- generating the first matrix of state vectors;
- generating the second matrix of values;
- generating the control update signals.

17. The method of claim 15 wherein the discrete time interval comprises one of a sample time and a control update time.

18. The method of claim 15 wherein the head is moved from the selected state to the final state with maximum control commands.

19. The method of claim 15 further comprising the step of accelerating the head for a first time period, and decelerating the head for a second time period to reach the final state, wherein the first and second time periods are approximately equal.

20. A data storage apparatus comprising:
- an actuator for moving a head; and
- a servo controller coupled to the actuator, the servo controller providing control command signals to the actuator to move the head from an initial position to an intermediate position within a first number of discrete time intervals based on a seek length, and to move the head from the intermediate position to a final position within a second number of discrete time intervals, the head having a non-zero velocity at all times while moving from the initial position to the final position;
- wherein a series of equations defines the control command signals, the series of equations comprising:
  - a first matrix of state vectors, each state vector representing at least one parameter selected from position, velocity, and acceleration of the disk drive head;
  - a second matrix of values corresponding to at least one characteristic of the actuator, wherein the first and second matrices form a series of equations describing actuator motion with respect to the disk; and
  - control command signals as a function of the first and second matrices, wherein the control command signals force the actuator from the intermediate position to the final position within the second number of discrete time intervals.

21. A method for performing a seek to move a disk drive head from an initial state to a final state comprising the steps of:
- determining the length of the seek;
- determining an intermediate state based on the length of the seek;
- determining a series of equations defining control update signals, the series of equations comprising:
  - a first matrix of state vectors, each state vector representing at least one parameter selected from position, velocity, and acceleration of the disk drive head;
  - a second matrix of values corresponding to at least one characteristic of the actuator, wherein the first and second matrices form a series of equations describing actuator motion with respect to the disk; and
  - control update signals as a function of the first and second matrices, wherein the control update signals force the actuator from the intermediate state to the final state within a second number of discrete time intervals;
- generating a first set of actuator signals to move the head from the initial state to the intermediate state within a first number of discrete time intervals based on seek length; and
- generating a second set of actuator signals to move the head from the intermediate state to a final state within a second number of discrete time intervals, the head having a non-zero velocity while traversing from the initial state to the final state.

22. The method of claim 21 further comprising the step of measuring state data.

23. The method of claim 21 further comprising the step of calculating state estimates.

24. The method of claim 21 further comprising the steps of:
- generating the first matrix of state vectors;
- generating the second matrix of values;
- generating the control update signals.

25. The method of claim 24 wherein the second matrix is an N×N matrix, where N is the order of the actuator, wherein the order of the actuator is the number of variables in the first matrix and wherein the variables describe the actuator using at least one parameter selected from supply voltage, actuator gain, and mechanics of the disk drive head.

26. The method of claim 21 further comprising the steps of:
- varying at least one actuator parameter selected from supply voltage, actuator gain, and mechanics of the disk drive head;
- analyzing variations in the second matrix in response to the step of varying at least one actuator parameter; and
- determining critical parameter variations of the actuator, wherein critical parameter variations prevent the actuator from reaching the final state with zero state error.

27. The method of claim 25 further comprising the step of:
- updating the second matrix to reflect the critical parameter variations of the actuator.

28. The method of claim 25 wherein the steps of generating the first and second sets of actuator signals are further characterized by:
- generating a first and second set of control signals; and
- amplifying the first and second set of control signals using a signal amplifier.

29. The method of claim 28 wherein the step of generating a second matrix of values corresponding to at least one parameter of an actuator is further characterized by:
- generating the second matrix values corresponding to at least one parameter of the signal amplifier.

30. A method of moving a head of a disk drive, comprising the steps of:
- determining a first number of discrete time intervals based on a seek length, wherein the first number of discrete time intervals corresponds to a first time to reach an intermediate track from an initial track;
- determining a second number of discrete time intervals based on an order of the actuator, wherein the order of the actuator is the number of variables to describe the actuator using at least one parameter selected from supply voltage, actuator gain, and mechanics of the disk drive head, wherein the second number of discrete time intervals corresponds to a second time to reach a final track from the intermediate track; and
- moving the head from the initial track to the final track without utilizing a separate track acquisition operation to position the head over the final track, the head having a non-zero velocity during the time period of traversing from the initial track to the final track.

* * * * *